C. MACBETH.
TIRE.
APPLICATION FILED SEPT. 17, 1917.
1,266,698.
Patented May 21, 1918
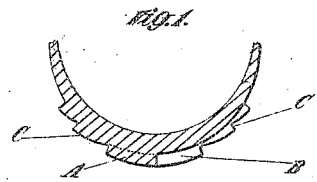
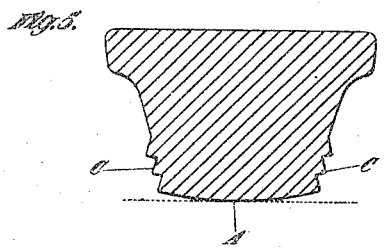
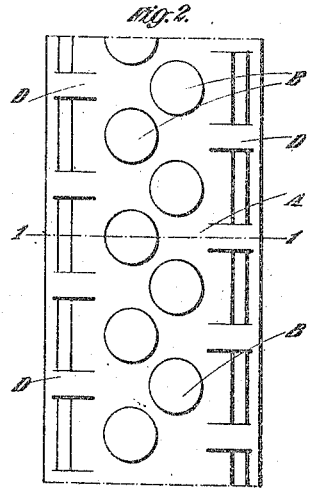
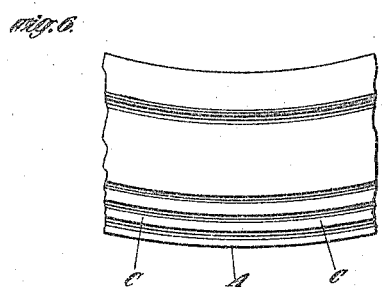
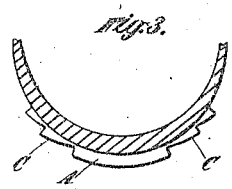
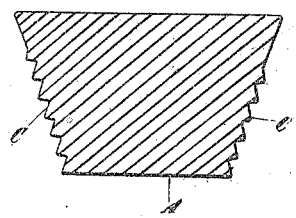
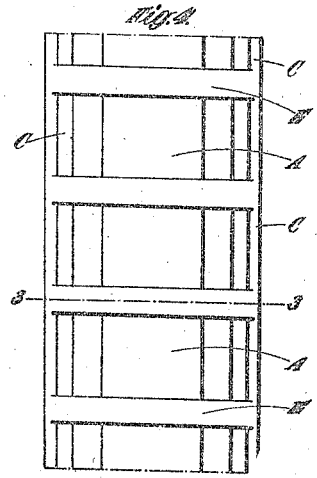
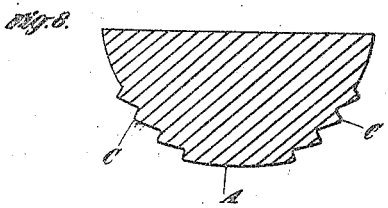
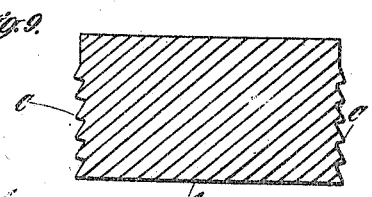

UNITED STATES PATENT OFFICE.

COLIN MACBETH, OF BIRMINGHAM, ENGLAND, ASSIGNOR TO THE DUNLOP RUBBER COMPANY, LIMITED, OF WESTMINSTER, ENGLAND.

TIRE.

1,266,698.  Specification of Letters Patent.  Patented May 21, 1918.

Application filed September 17, 1917. Serial No. 191,836.

*To all whom it may concern:*

Be it known that I, COLIN MACBETH, a subject of the King of Great Britain, residing at Manor Mills, Salford street, Aston, Birmingham, in the county of Warwick, England, have invented certain new and useful Improvements in or Relating to Tires, of which the following is a specification.

This invention relates to tires of the pneumatic or solid type and is especially applicable to tires for vehicles having three or more wheels, the chief object being to provide a tire which throughout its life will effectively resist or prevent lateral skidding.

According to this invention the tread portion of the tire is formed with inwardly directed edges so as to form angular corners or edges for preventing lateral skidding which do not project beyond the surface of the tread portion, and from each angular corner or edge each side of the tire is provided with a series of angular portions of similar shape and arrangement to the angular corners or edges of the tire tread thus presenting a kind of serrated, stepped or coxcomb formation at each side of the tire, the said angular portions being adapted, as the tire tread wears, to successively constitute the angular corners or edges of the tread whereby the tire throughout its life is provided with efficient anti-skidding edges at the tread portion.

The present invention is applicable to all types and shapes of tires and the exact formation of the coxcomb, stepped or serrated sides will to some extent depend upon the shape of tire to which the invention is applied. The invention is especially suitable for solid or other tires which are provided with plain treads but as hereinafter set forth it is also applicable to tires of which the treads are formed with studs, grooves or the like, as in many pneumatic tires.

In order that the invention may be clearly understood and readily carried into effect the same will now be described more fully with reference to the accompanying drawings, in which:—

Figures 1 and 2 are respectively a transverse sectional view through and an elevational view of a portion of a pneumatic tire showing one form of the invention.

Figs. 3 and 4 are similar views to Figs. 1 and 2, illustrating a modification.

Figs. 5 and 6 are respectively a transverse sectional view through and an elevational view of a portion of a solid tire, made in accordance with this invention.

Figs. 7, 8 and 9, are transverse sectional views of different shapes of solid tires made in accordance with this invention.

In the example shown in Fig. 1, A is the tread or main wearing part of the tire provided with a series of staggered studs B B and at each side portion of the tread are specially shaped ribs or projections C C extending circumferentially around the tire, constituting the coxcomb or stepped portions. The outer ribs of the coxcomb portions form the inwardly directed edges or angular corners of the tread, the said inwardly directed edges or angular corners serving to arrest or check lateral skidding of the tire and as the tread wears, the ribs C successively form the angular corners of the tread, so that the tire throughout its life is always provided with a tread having anti-skidding edges. The coxcomb portions or ribs C C at each side of the tread are interrupted by transverse grooves D D, the grooves being preferably arranged with relation to the staggered studs in the manner shown in Fig. 2.

In the example shown in Figs. 3 and 4 the middle part A of the tread is plain and the edges thereof are shaped to form part of the coxcomb or stepped portions C C as aforesaid. In this example transverse grooves E extend wholly across the tread so as to interrupt both sets of coxcomb portions C C and the middle part A of the tread. Although the invention is shown in Figs. 1 to 4 applied to tires having patterned or grooved treads, it is especially applicable to tires having plain treads as in solid tires and some pneumatic tires.

The examples shown in Figs. 5 to 9 illustrate the invention applied to different sections of solid tires having curved, rounded or flat treads, and of different widths and widely different load capacities.

In each of these examples A represents the tread or main wearing part of the tread, and C C represent the two coxcomb, stepped or serrated portions which are arranged one on each side of the tread A. The application of the coxcomb portions to a solid tire is advantageous for several reasons as hereinafter specified. Usually it is found that an ordinary solid tire having in cross section a rounded or curved contour or tread is very liable to skid because the mud collects at the edges of the tread and wedges under the latter, and consequently it is difficult for the tire to obtain a firm grip or bearing on the road surface. A solid tire of square or approximately square section is not so liable to the above objection as it always presents approximately vertical sides or edges to the road surface, but tires of square sections are not economical in the use and disposition of the rubber, and moreover are not sufficiently resilient having regard to the amount of rubber employed. Furthermore many solid tires are used for special work such as motor fire engine service, where the wear is not great but skidding is a great trouble. In such cases a tire with coxcomb sides as shown in Fig. 8 is especially suitable. The present invention enables a solid tire of any section to grip or bear firmly on the road surface so as to mitigate or prevent skidding and at the same time allows of the best possible disposition of the rubber to obtain economy, resiliency and durability. As shown in all the examples illustrated in the drawings the edges of the tread portions are such that when the tire is bearing on the road and is presenting a more or less flat surface thereto, they present vertical or even inwardly inclined surfaces to the road so as to prevent the mud from collecting or wedging under the tread surface or adjacent to the edges thereof, and this applies to any type or shape of tire to which the invention is applied. The coxcomb portions comprise any number of concentric projections shaped and arranged as shown, which form the inwardly directed edges or angular corners. As the tread surface wears the inwardly inclined or vertical surfaces at the edges of the tire tread are gradually reduced until the tread surface reaches the next concentric projections which form the inwardly directed edges or corners for the tread. In this manner the tire edges retain their original shape throughout the life of the tire. The lower part or base of the tire may be of any desired shape to suit any type of rim. It is essential for efficiency and economy that a tire shall have a suitable shape to stand the loads and conditions under which it works and the present invention enables this to be accomplished; the coxcomb or stepped sides as herein set forth allow of such shape or profile as may be necessary giving the average section required and also providing throughout the life of the tire effective lateral anti-skidding edges.

What I claim and desire to secure by Letters Patent of the United States is:—

1. A tire comprising a tread, inwardly directed edges or angular corners at each side of the tread to prevent skidding and a series of portions at each side of the tread, of similar shape and formation to said inwardly directed edges or angular corners, which portions as the tire wears, successively present the same relative shape to the road surface to form anti-skidding edges for the tread during the life of the tire.

2. A tire comprising a tread, inwardly directed edges or angular corners at each side of the tread to prevent skidding, concentric annular portions at each side of the tire of similar shape and formation to said inwardly directed edges or angular corners which portions as the tire wears, successively present the same relative shape to the road surface to form anti-skidding edges for the tread during the life of the tire.

3. A solid tire having a plain tread inwardly directed edges or corners at each side of the tread to prevent skidding and a series of stepped portions at the sides of the tire which portions as the tire wears successively present the same relative shape to the road surface to form anti-skidding edges for the tread during the life of the tire.

4. A tire comprising a tread, inwardly directed edges or angular corners at each side of the tread to prevent skidding, concentric annular portions at each side of the tread of similar shape and formation to said inwardly directed or angular corners, which portions as the tire wears, successively present the same relative shape to the road surface to form anti-skidding edges for the tread during the life of tire, the successive annular portions being of greater distances from the center of said tire so that as the tire wears the wearing surface increases in area.

COLIN MACBETH.